(12) United States Patent
Poon

(10) Patent No.: US 12,450,446 B2
(45) Date of Patent: Oct. 21, 2025

(54) POWER SIGNAL INTERACTION WITH OBJECT INCLUDING RFID TAG

(71) Applicant: VTech Electronics Limited, Tai Po (HK)

(72) Inventor: Dicky Fai Wong Poon, Tai Po (HK)

(73) Assignee: VTech Electronics Limited, Tai Po (HK)

( * ) Notice: Subject to any disclaimer, the term of this patent is extended or adjusted under 35 U.S.C. 154(b) by 104 days.

(21) Appl. No.: 18/364,963

(22) Filed: Aug. 3, 2023

(65) Prior Publication Data

US 2025/0045540 A1 Feb. 6, 2025

(51) Int. Cl.
*G06K 7/00* (2006.01)
*G06K 7/10* (2006.01)

(52) U.S. Cl.
CPC ....... *G06K 7/0008* (2013.01); *G06K 7/10297* (2013.01); *G06K 7/10366* (2013.01)

(58) Field of Classification Search
CPC ............. G06K 7/0008; G06K 7/10297; G06K 7/10366; G06K 7/0095; G05B 19/042; G05B 2219/21053
See application file for complete search history.

(56) References Cited

U.S. PATENT DOCUMENTS

| | | |
|---|---|---|
| 7,217,135 B2 | 5/2007 | Marcus et al. |
| 8,702,515 B2 | 4/2014 | Weston et al. |
| 8,845,384 B2 | 9/2014 | Ghaly |
| 8,961,260 B2 | 2/2015 | Weston |
| 9,737,802 B2 | 8/2017 | Shi et al. |
| 2004/0214642 A1* | 10/2004 | Beck ........................ A63H 3/28 463/40 |
| 2009/0058652 A1* | 3/2009 | Hardy .................... H04B 7/155 340/572.1 |

OTHER PUBLICATIONS

VTech, "Users Manual—Go! Go! Smart Animals, Zoo Explorers Playset," 2014, 18 pages.

* cited by examiner

*Primary Examiner* — Vernal U Brown
(74) *Attorney, Agent, or Firm* — Kilpatrick Townsend & Stockton LLP

(57) ABSTRACT

A method conducted using a system having a first object with a first data processor, an RFID tag reader, and a first output device electrically coupled to the first data processor, and a second object with a second data processor, an RFID tag, and a second output device electrically coupled to the second data processor includes: transmitting, by the RFID tag reader to the RFID tag, a power signal with embedded input data; receiving, by the RFID tag, the power signal with the embedded input data. The embedded input data is extracted from the power signal and provided to the second data processor, and causes the second data processor to initiate an action. Responsive to receiving the power signal with the embedded input data, transmitting, by the RFID tag, response data to the RFID tag reader, wherein the first data processor processes the response data.

22 Claims, 6 Drawing Sheets

POWER SIGNAL INTERACTION WITH OBJECT INCLUDING RFID TAG

BACKGROUND

Unless otherwise indicated herein, the materials described in this section are not prior art to the claims in this application and are not admitted to being prior art by inclusion in this section.

Playsets and other similar entertainment devices provide interactive play as well as learning and entertainment opportunities for children. RFID technology can be incorporated into games and toys to increase the learning and entertainment opportunities that stimulate creativity and imagination.

Radio Frequency Identification (RFID) technology is commonly used to identify objects in a playset. An RFID reader transmits some power to a receiver, i.e., a passive RFID tag. The passive RFID tag harvests energy from the transmitted signal to power the tag to enable it to return some digital data to the reader, for example, a code identifying the RFID tag and possibly some information about the object to which the RFID tag is attached. When integrated into a playset, an RFID reader incorporated into an object such as an action figure or other toy may communicate with a passive RFID tag embedded in a game board to cause the action figure or other toy to speak some preprogrammed dialogue thereby providing a more interactive environment. However, the interaction with the object is limited by the static information programmed into the passive RFID tag.

SUMMARY

Systems and methods for controlling interactions between an RFID reader and one or more objects having passive RFID tags are provided.

According to various aspects there is provided a method conducted using a system having a first object with a first data processor, an RFID tag reader, and a first output device electrically coupled to the first data processor, and a second object with a second data processor, an RFID tag, and a second output device electrically coupled to the second data processor. In some aspects, the method may include: transmitting, by the RFID tag reader to the RFID tag, a power signal with embedded input data; receiving, by the RFID tag, the power signal with the embedded input data. The embedded input data may be extracted from the power signal and provided to the second data processor and may cause the second data processor to initiate an action. Responsive to receiving the power signal with the embedded input data, the RFID tag may transmit response data to the RFID tag reader. The first data processor may process the response data.

According to various aspects there is provided a system. In some aspects, the system may include: a first object having: a radio frequency identification (RFID) tag reader, a first output device, and a first data processor electrically coupled to the first output device and the RFID tag reader; and a second object having: an RFID tag, a second output device, and a second data processor electrically coupled to the second output device and the RFID tag.

The first object may be configured to transmit an RF power signal comprising embedded input data. The second object may be configured to receive, via the RFID tag, the RF power signal and perform an action specified by the embedded input data and, responsive to receiving the RF power signal, transmit, by the RFID tag, response data to the RFID tag reader. The first data processor may process the response data.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Aspects of the present disclosure can provide an interactive playset incorporating RFID technology that enhances interactions between an RFID platform of the playset and objects having RFID capability that are manipulated on the platform as well as interactions between different objects of the playset.

Passive Radio Frequency Identification (RFID) tags are electronic devices used for identification and tracking purposes. They consist of a microchip and an antenna, enclosed in a protective material. Unlike active RFID tags that have their own power source, passive RFID tags do not have an internal power supply and rely on energy harvested from the RFID tag reader's radio waves to operate. A passive RFID tag receives its power from signals radiated from an antenna of an RFID tag reader, whose electromagnetic wave induces a current in the antenna of the RFID tag. The harvested energy is used to power the microchip within the tag. The microchip contains a unique identification number and may also store some additional static data. To transmit the stored data back to the RFID tag reader, the microchip modulates the impedance of the RFID tag antenna causing reflections in the electromagnetic field created by the RFID tag reader in a process known as backscattering. The RFID tag can vary the reflections received by the RFID tag reader in a way that encodes the unique identification number and static data stored on the microchip.

According to some aspects of the present disclosure systems and methods for controlling interactions between an RFID platform and one or more objects having passive RFID tags are provided. The objects may be configured with additional circuitry to enable the objects to provide audio and/or visual responses to instructions or commands received from the RFID platform and to provide responses that include dynamic data from the RFID tag. The RFID platform may be configured to transmit an RF power signal to the object. The RF power signal may be modulated by a coded command corresponding to an action to be performed by the object. For example, the coded command may instruct the object to output an audio or visual response to a question spoken by the platform. The object may decode the command and perform the action.

Figure 1:
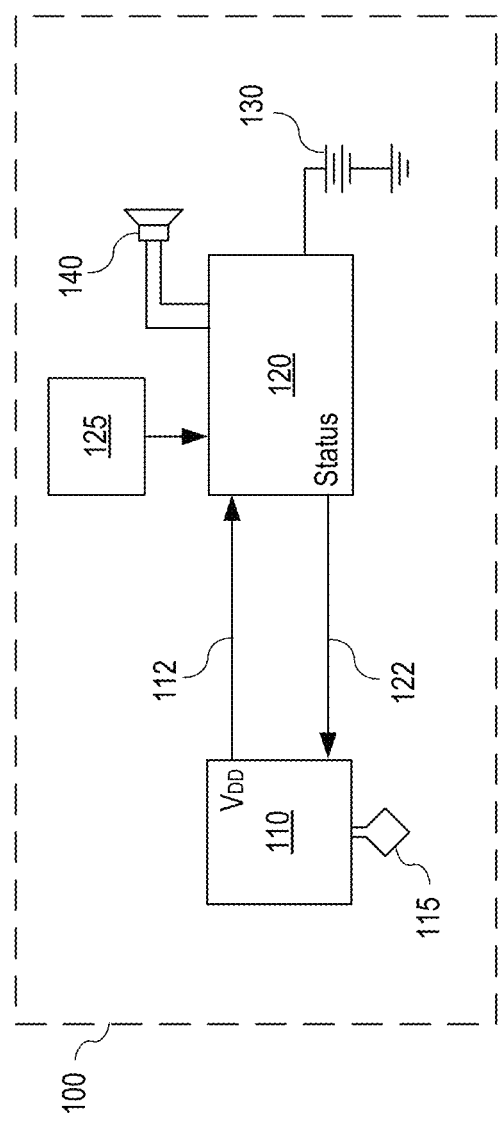
FIG. 1 is a block diagram illustrating an example of a configuration of an object according to some aspects of the present disclosure.

FIG. 1 is a block diagram illustrating an example of a configuration of an object 100 according to some aspects of the present disclosure. The object 100 may be styled as a figurine, for example, but not limited to, an animal figurine, a vehicle figurine, or other character or article. In some implementations, the object 100 may be one of a plurality of figurines associated with a playset. Referring to FIG. 1, the object 100 may include a passive RFID tag 110 having an antenna 115, a microcontroller unit (MCU) referred to herein as the tag MCU 120, and sensors 125. The tag MCU 120 may be powered by a power source, for example, a battery 130 or other power source. The tag MCU 120 may be configured to drive an output device 140. The output device 140 may be, for example, but not limited to, a speaker, a visual indicator such as one or more lighting devices or video displays, or other output device suitable for inclusion in the object.

The antenna 115 may be configured to receive signals from and transmit signals to the RFID platform via the RF power signal. The RF power signal may be transmitted in a frequency range of 30 kHz to 500 kHz (low-frequency RFID) or a frequency in a range of 3 MHz to 30 MHz (high-frequency RFID). The passive RFID tag 110 may include circuitry (not shown), for example, a microchip, configured to store identification and status information and to transmit the identification and status information to the RFID platform, as well as circuitry configured to harvest energy from the RF power signal and provide power for the passive RFID tag 110. At least some of the identification and/or status information stored in the passive RFID tag 110 may be configurable by the tag MCU 120. The passive RFID tag 110 and the tag MCU 120 may exchange information signals 112, 122.

The sensors 125 may include, for example, but not limited to, a light sensor, a tilt sensor, a switch, or another type of sensor. The sensors 125 may communicate with the tag MCU 120. The light sensor may be configured to detect light indicating daytime and/or nighttime. The tilt sensor may detect an orientation of the object 100. The switch may be a mechanical switch, an electrical switch, or another type of switch. The switch may open or close to detect the presence or proximity of two objects. For example, the switch may detect the presence of an animal figurine on a trolley or a driver in a vehicle figurine. Other configurations or combinations related to figurines may be provided without departing from the scope of the present disclosure.

The tag MCU 120 may be, for example, a microprocessor, microcomputer, microcontroller, programmable controller, or other programmable device. The tag MCU 120 may include internal memory and/or may be configured to communicate with computer readable media (not shown) such as memory external to the tag MCU 120. The external memory may be a storage device such as a solid state storage device or other storage device and may be a combination of volatile and non-volatile storage or memory. The memory may store instructions that when executed cause the object to perform actions associated with the received commands.

Figure 2:
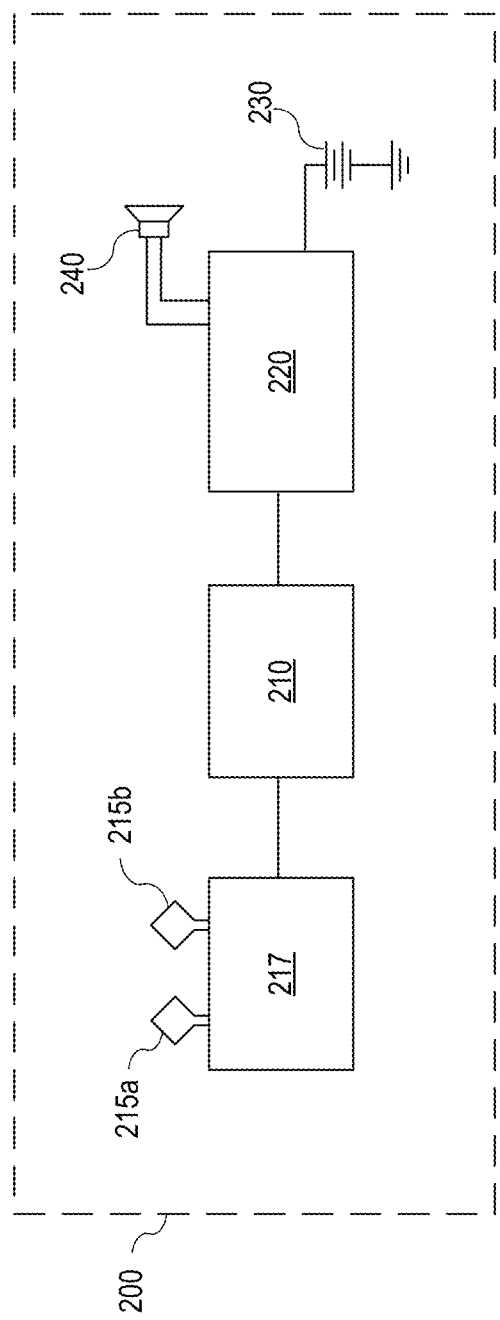
FIG. 2 is a block diagram illustrating an example of a configuration of an RFID platform according to some aspects of the present disclosure.

FIG. 2 is a block diagram illustrating an example of a configuration of an RFID platform 200 according to some aspects of the present disclosure. The RFID platform 200 may be, for example, but not limited to, a portion of a gameboard of the interactive playset. Referring to FIG. 2, the RFID platform 200 may include an RFID tag reader 210, an antenna switching unit 217 coupled to a plurality of antennas 215a, 215b, and an MCU referred to herein as the reader MCU 220.

The plurality of antennas 215a, 215b may be configured to transmit signals to and receive signals from the antennas of the passive RFID tags of objects such as the object 100 illustrated in FIG. 1 that are positioned within the electromagnetic field of each antenna 215a, 215b. While two antennas are illustrated in FIG. 2, it should be appreciated that more than two antennas may be provided without departing from the scope of the present disclosure. The antenna switching unit 217 may be configured to transmit/receive sequentially from each antenna in predetermined time intervals. The antenna switching unit 217 may be included in the reader MCU 220 or may be circuitry external to the reader MCU 220.

The antenna switching unit 217 may select which antenna to transmit the power signal and detect a tag. For example, the antenna switching unit 217 may enable a first antenna for a specified period of time, for example, 8 ms or another period of time, to detect and transmit a command to a passive RFID tag detected by the first antenna. After the specified period of time, the antenna switching unit 217 may enable a second antenna for a specified period of time, for example, 8 ms or another period of time, to detect and transmit a command to a passive RFID tag detected by the second antenna. When a passive RFID tag detected is not detected in the electromagnetic field of an antenna, the antenna switching unit 217 may not transmit a command and may enable a next antenna. Each antenna may be sequentially enabled for the specified period of time during a repeated cycle time, for example, 100 ms or another cycle time. In some implementations, the cycle time may vary based on the number of antennas provided in the RFID platform 200.

The RFID tag reader 210 transmits and receives RF signals to the RFID tags of objects via the plurality of antennas 215a, 215b. The RF power signal may be transmitted in a frequency range of 30 kHz to 500 kHz (low-frequency RFID) or a frequency in a range of 3 MHz to 30 MHz (high-frequency RFID). Each of the plurality of antennas 215a, 215b sequentially radiate the RF energy which is absorbed by the RFID tag (e.g., the RFID tag 110) of an object such as the object 100 within the electromagnetic field of the antenna. The RFID tag uses the absorbed energy to power up and return data from the microchip of the RFID tag.

The reader MCU 220 may be powered by a power source, for example, a battery 230 or other power source. The reader MCU 220 may be configured to drive an output device 240. The output device 240 may be, for example, but not limited to, a speaker, a visual indicator such as one or more lighting devices or video displays, or other output device suitable for inclusion in the gameboard.

The reader MCU 220 may be, for example, a microprocessor, microcomputer, microcontroller, programmable controller, or other programmable device. The reader MCU 220 may include internal memory and/or may be configured to communicate with computer readable media (not shown)

such as memory external to the reader MCU 220. The external memory may be a storage device such as a solid state storage device or other storage device and may be a combination of volatile and non-volatile storage or memory. The memory may store instructions that when executed cause the RFID platform 200 to perform actions, for example, but not limited to, outputting audio questions, for interacting with the objects.

The instructions may include preprogrammed commands to be sent to the object (e.g., the object 100) to perform actions. For example, the instructions may cause the RFID platform 200 to output a question via the output device 240 and send a command to the object to provide an expected preprogrammed response to the question. In this manner, a preprogrammed dialogue between the RFID platform 200 and the object may be conducted to simulate a conversation. Other instructions and commands may cause the object to perform other actions such as singing a song and/or causing the RFID platform 200 to sing in harmony with the object.

According to some aspects of the present disclosure, time synchronization of the antennas (e.g., the antennas 215a, 215b) by the reader MCU 220 for transmitting signals to the objects and receiving RF signals from the objects can enable preprogrammed dialogue between two or more objects within electromagnetic fields of two different antennas. For example, after causing a first object detected in the electromagnetic field of a first antenna to output a first preprogrammed response, the reader MCU 220 may cause a second object detected in the electromagnetic field of a second antenna to output a second preprogrammed response that is responsive to the first preprogrammed response of the first object. Each antenna may be limited to detecting one object at a time within the electromagnetic field of the antenna.

Figure 3:
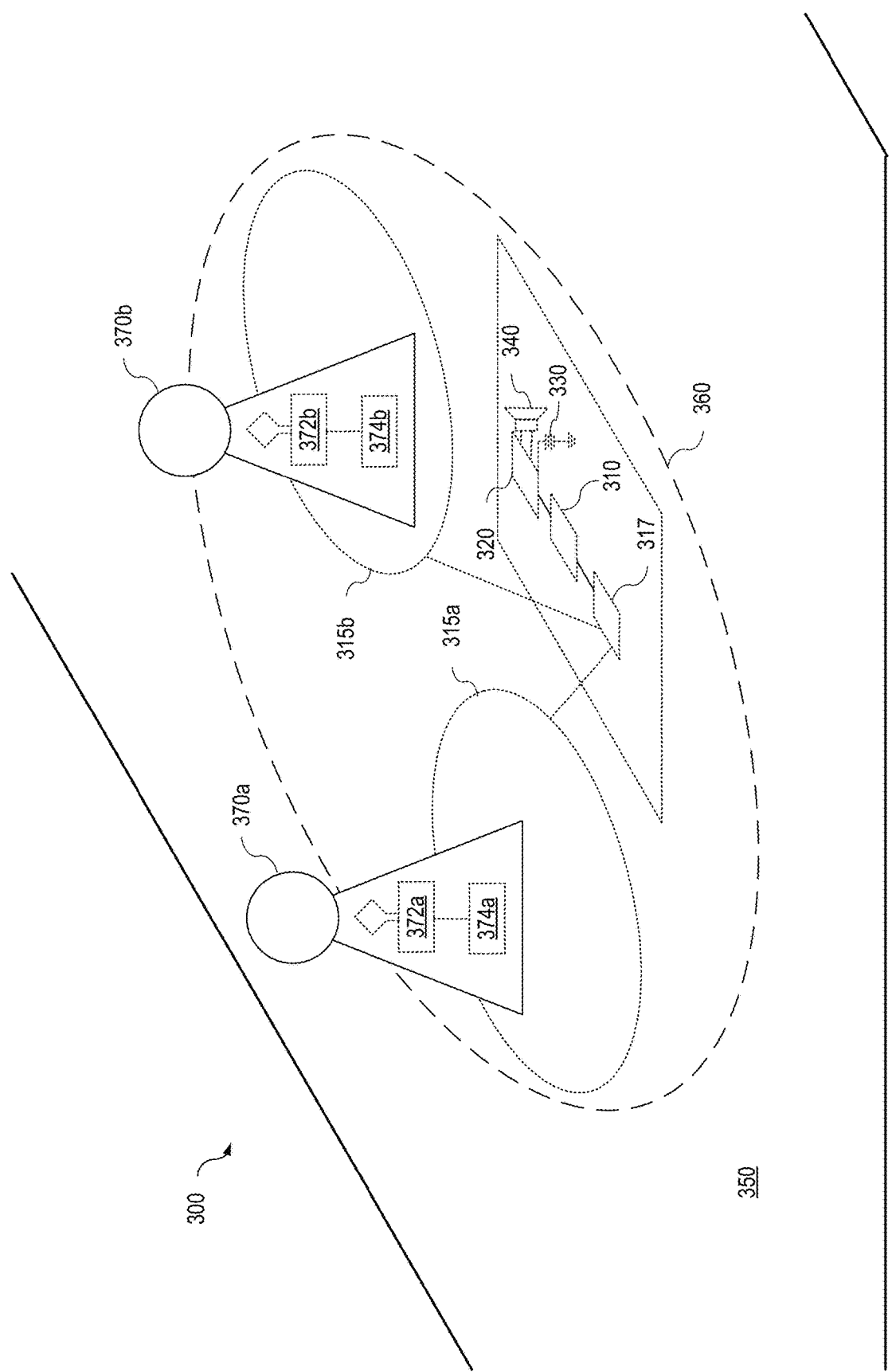
FIG. 3 is a schematic illustration of a playset according to some aspects of the present disclosure.

FIG. 3 is a schematic illustration of an interactive playset 300 according to some aspects of the present disclosure. The interactive playset 300 may include a gameboard 350, RFID platform 360, and objects 370a, 370b. The RFID platform 360 may include an RFID tag reader 310, an antenna switching unit 317 coupled to a plurality of antennas 315a, 315b, and a reader MCU 320. The RFID tag reader 310, antenna switching unit 317, antennas 315a, 315b, and reader MCU 320 may be the RFID tag reader 210, antenna switching unit 217, antennas 215a, 215b, and reader MCU 220 as illustrated and described with respect to FIG. 2. The objects 370a, 370b may be objects 100 as illustrated and described with respect to FIG. 1.

The RFID platform 360 may further include a power source, for example, a battery 230, and an output device 240, for example, a speaker, a visual indicator. In some implementations, the power source and/or the output device may be embedded in the gameboard 350. In some implementations, the power source and/or the output device may be provided external to the gameboard.

In some implementations, the interactive playset 300 may be, for example, a farm playset with the gameboard 350 being a barnyard and the objects 370a, 370b being animals. As another example, the interactive playset 300 may be a construction playset with the gameboard 350 being a construction site and the objects 370a, 370b being vehicles. It should be appreciated that other playset configurations may be provided without departing from the scope of the present disclosure.

According to some aspects of the present disclosure, the reader MCU 220 may be configured to modulate the RF power signal transmitted to the RFID tag of an object. The memory of the reader MCU 220 may store coded commands associated with actions to be performed by an object. The reader MCU 220 may cause the RFID tag reader 210 to modulate the RF power signal transmitted to the RFID tag of an object according to a command to be sent to the object.

Figure 4:
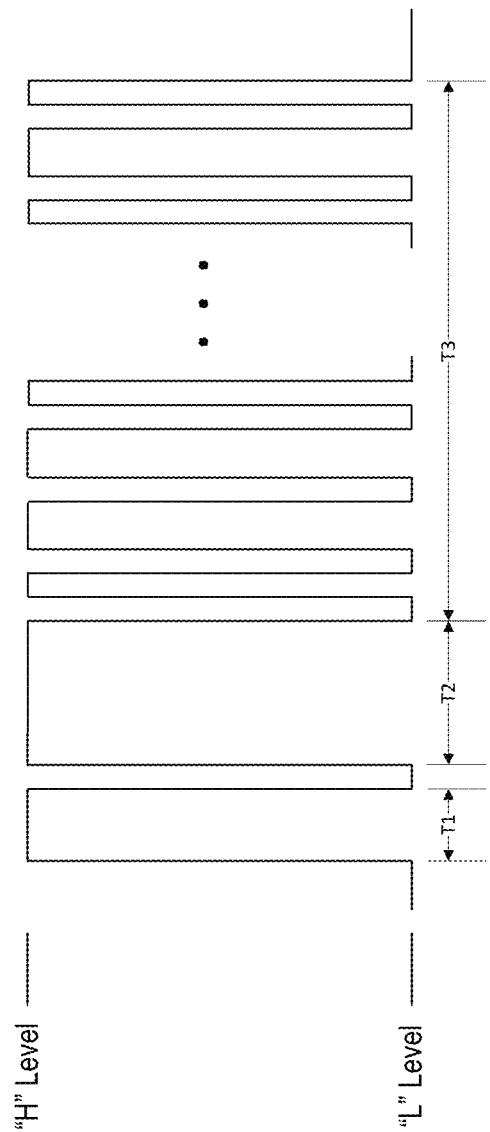
FIG. 4 is a diagram illustrating an example of a modulation signal for modulating the RF power signal according to some aspects of the present disclosure.

FIG. 4 is a diagram illustrating an example of a modulation signal for modulating the RF power signal according to some aspects of the present disclosure. The reader MCU 220 may cause the RFID tag reader 210 to modulate the RF power signal between a "L" level and a "H" level to transmit a digitally coded command to the RFID tag in the object. Referring to FIG. 4, during time interval T1, the RFID tag reader of the RFID platform may transmit the RF power signal to the RFID tag of the object and the RFID tag of the object may return the stored identification and status information. The time interval T1 may be, for example 3.5 ms or another time interval. When valid identification information is received by the RFID tag reader, the RFID tag reader may modulate the RF power signal during time interval T2 to transmit header bits. The time interval T2 may be, for example, 6 ms or another time interval.

During the time interval T3, the RFID tag reader may modulate the RF power signal to transmit the command to the object. In some implementations, the command may include 24 bits with a "0" bit being defined by modulating the RF power signal for approximately 0.8 ms at a "L" level and approximately 0.8 ms at a "H" level and a "1" bit being defined by modulating the RF power signal for approximately 0.8 ms at a "L" level and approximately 2.0 ms at a "H" level. It should be appreciated that other coding schemes and timing intervals may be used without departing from the scope of the present disclosure.

Referring again to FIG. 1, when received by the RFID tag 110 of the object 100 the modulation of the RF power signal may be passed through the power terminal, VDD, and/or the ground terminal, GND, of the RFID tag 110 to the tag MCU 120. The VDD and/or the GND terminal of the RFID tag 110 may be electrically coupled to an input terminal of the tag MCU 120. The tag MCU 120 may receive the power signal (e.g., the VDD signal 112) from the RFID tag 110 and decode the modulation of the power signal to receive the command. The tag MCU 120 may compare the received commands to a set of preprogrammed commands, for example, in a command table or other structure, and perform the preprogrammed instructions associated with the command. In some implementations, the command table may be a voice index table and the tag MCU 120 may cause the output device 140 the object 100 to output a voice corresponding to a voice index number in the voice index table. For example, a received command may instruct the object 100 to respond to the question "How are you today?" spoken by the output device 240 of the RFID platform with the preprogrammed response "I am fine" spoken by the output device 140 of the object 100.

Response data returned to the RFID tag reader by the RFID tag 110 may include identification information and status information for the object. The identification information returned by the object may be a code that identifies the object as a character of the interactive playset. For example, in the interactive farm playset example, the code may identify an object as a pig or a chicken. The identification information may be preprogrammed into the RFID tag 110. For example, the identification information may be stored in nonvolatile memory or may be hardcoded using fuse/antifuse technologies or another method. It should be appreciated that other methods of preprogramming the identification information may be used without departing from the scope of the present disclosure.

In some implementations, the both the identification information and the status information for the object may be reprogrammed by the tag MCU 120.

Figure 5:
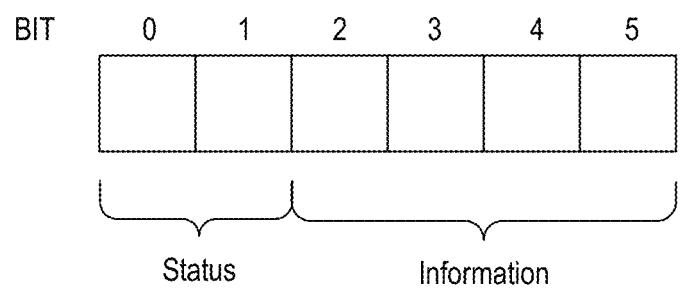
FIG. 5 illustrates an example of identification and status information provided by an RFID tag according to some aspects of the present disclosure.

FIG. 5 illustrates an example of the identification and status information provided by the RFID tag 110 according to some aspects of the present disclosure. The identification and status information may be a digital word 510 including a plurality of bits. Referring to FIG. 5, bits 2-5 may be preprogrammed in the digital word 510 to identify the object as a character of the interactive playset (e.g., pig, chicken, etc.). Bits 0, 1 in the digital word 510 may be status bits that are updated by the tag MCU 120 during operation of the playset. For example, the status bits 0, 1 may indicate a status of command execution by the object 100 and/or a power level of the object battery 130. It should be appreciated that other configurations of identification and status information may be used without departing from the scope of the present disclosure. Further, it should be understood that more than one word or words having different lengths and/or bit assignments may be used without departing from the scope of the present disclosure.

According to some aspects of the present disclosure, the status information returned to the RFID tag reader may be updated to the RFID tag 110 by the tag MCU 120. The tag MCU 120 may set the values of one or more status information bits in the digital word prior to the identification and status information being returned to the RFID tag reader 210 in response to receiving the RF power signal from the RFID tag reader 210.

The status information updated by the tag MCU 120 may indicate that an action to be performed according to a command is in progress or the commanded action is completed. For example, after receiving and decoding a command, the tag MCU 120 may execute instructions to cause the object 100 to perform an action. The tag MCU 120 may update the values of one or more status bits in the RFID tag 110 to indicate that a command is being executed. Upon completion of the command, the tag MCU 120 may again update the one or more status bits to indicate that the command has completed execution.

The status information may further indicate a battery power level of the object. For example, the tag MCU 120 may monitor the voltage of the battery 130 of the object 100 and update the one or more status bits in the RFID tag 110 to indicate a power level of the battery 130. When the RFID tag reader 210 receives status information indicating that the battery power level of the object 100 is low, the RFID tag reader 210 may determine that the object 100 is unable to perform commanded actions and may stop sending commands to the object 100.

Additionally or alternatively the status information may further indicate the status of one or more of the sensors 125 of the object 100. In some implementations, the status information may additionally or alternatively indicate the status of one or more of the sensors 125 of the object 100. For example, the status information may indicate daytime and/or nighttime an orientation of the object, the presence or proximity of two objects.

The identification information and status information may be returned by the RFID tag 110 to the RFID tag reader 210 as a modulated reflection of the power signal. For example, the identification information and status information may be returned as a six bit word with four bits providing the identification information (e.g., "pig," "chicken," etc.) and two bits providing the status information (e.g., "command complete," "battery power low," etc.). It should be understood that more than one word or words having different lengths and/or bit assignments may be used without departing from the scope of the present disclosure.

Figure 6:
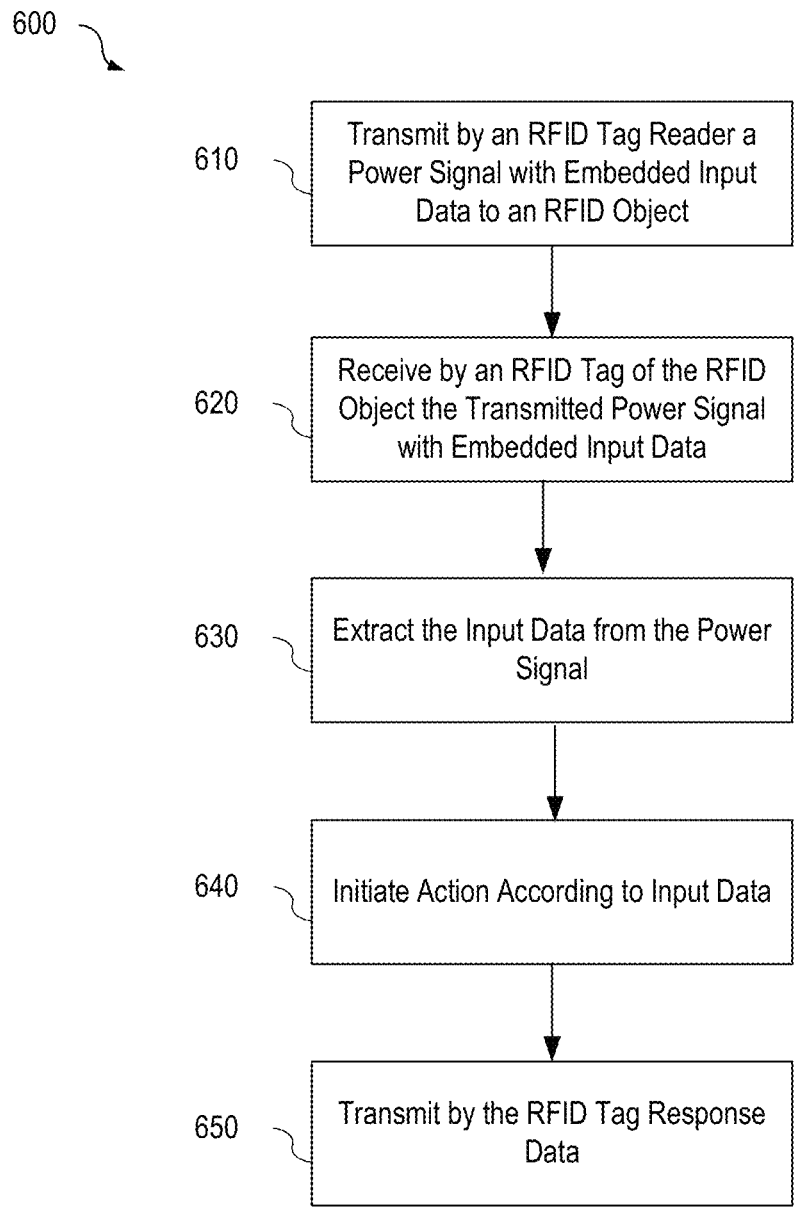
FIG. 6 is a flowchart illustrating an example of a method for controlling interactions between an RFID reader and one or more objects having passive RFID tags according to aspects of the present disclosure.

FIG. 6 is a flowchart illustrating an example of a method 600 for controlling interactions between an RFID tag reader and one or more objects having passive RFID tags according to aspects of the present disclosure. Referring to FIG. 6, at block 610, an RFID tag reader may transmit a power signal to an object. The RF power signal may be transmitted in a frequency range of 30 kHz to 500 kHz (low-frequency RFID) or a frequency in a range of 3 MHz to 30 MHz (high-frequency RFID). An MCU of the RFID tag reader may cause the RFID tag reader to modulate the RF power signal between a "L" level and a "H" level to transmit a digitally coded command to the RFID tag in the object.

At block 620, an RFID tag of the object may receive the transmitted power signal. When received by the RFID tag of the object, the modulation of the RF power signal may be passed through the power terminal, VDD, and/or the ground terminal, GND, of the RFID tag to the tag MCU. The VDD and/or the GND terminal of the RFID tag may be coupled to an input terminal of the tag MCU.

At block 630, input data may be extracted from the power signal. The tag MCU may receive the power signal from the RFID tag and decode the modulation of power signal to receive the command. The tag MCU may compare the received commands to a set of preprogrammed commands, for example, in a command table or other structure.

At block 640, an action may be initiated by an object associated with the RFID tag. The tag MCU may execute instructions to cause the object to perform preprogrammed actions associated with the command. For example, a received command may instruct the object to respond to the question "How are you today?" spoken by the output device of the RFID platform with the preprogrammed response "I am fine" spoken by the output device of the object.

At block 650, response data may be transmitted by the RFID tag. Response data may be returned to the RFID tag reader by the RFID tag. The response data may include identification information and status information for the object. The identification information returned by the object may be a code that identifies the object as a character of the interactive playset. For example, in the interactive farm playset example, the code may identify an object as a pig or a chicken. The identification information may be preprogrammed into the RFID tag 110. For example, the identification information may be stored in nonvolatile memory or may be hardcoded using fuse/antifuse technologies or another method. It should be appreciated that other methods of preprogramming the identification information may be used without departing from the scope of the present disclosure.

The tag MCU may set the values of one or more bits in the status information prior to the identification and status information being returned to the RFID tag reader in response to receiving the RF power signal from the RFID tag reader. The status information updated by the tag MCU may indicate that an action to be performed according to a command is in progress or the commanded action is completed. The status information may further indicate a battery power level of the object.

The specific operations illustrated in FIG. 6 provide a particular method for controlling interactions between an RFID tag reader and one or more objects having passive RFID tags according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 6 may include multiple sub-operations that may be performed in various sequences as appropriate to the individual operation. Furthermore, additional operations may be added or removed depending on the particular applications.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method conducted using a system comprising a first object comprising a first data processor, a radio frequency identification (RFID) tag reader and a first output device electrically coupled to the first data processor, and a second object comprising a second data processor, and a battery, an RFID tag, and a second output device electrically coupled to the second data processor, the method comprising:
   transmitting, by the RFID tag reader in the first object to the RFID tag in the second object, a power signal with embedded input data, the input data embedded into the power signal by modulating the power signal between high and low levels at different time intervals;
   receiving, by the RFID tag in the second object, the power signal with the embedded input data, wherein the embedded input data is extracted from the power signal and is provided to the second data processor, and causes the second data processor to initiate an action in response to a first audio or visual output from the first output device in the first object, the action being a second audio or visual output from the second output device that is responsive to the first audio or visual output; and
   responsive to receiving the power signal with the embedded input data, transmitting, by the RFID tag, response data to the RFID tag reader in the first object, wherein the first data processor processes the response data.

2. The method of claim 1, wherein the embedded input data is generated by modulating the power signal with a digital word.

3. The method of claim 2, wherein the modulated power signal is passed by a power supply terminal of the RFID tag to an input of the second data processor, and
   wherein the second data processor decodes the modulation to extract the input data.

4. The method of claim 1, wherein the second object is a figurine.

5. The method of claim 1, wherein the second object is one of a plurality of figurines in a set of figurines.

6. The method of claim 1, wherein the first object is an RFID platform comprising a game board configured for use with one or more second objects.

7. The method of claim 1, the power signal comprises an RF signal having a frequency in a range of 30 kHz to 500 kHz or a frequency in a range of 3 MHz to 30 MHz.

8. The method of claim 1, further comprising, prior to transmitting, by the RFID tag, response data to the RFID tag reader in the first object, updating by the second data processor, status information of the second object included in the response data.

9. The method of claim 8, wherein the status information comprises one or more of a status of execution of a command by the second object, a status of a power level of the second object, or a status of a sensor of the second object.

10. The method of claim 1, wherein the RFID tag is a passive RFID tag.

11. The method of claim 1, wherein the first audio or visual output is a question, and the second audio or visual output is an answer that is responsive to the question.

12. The method of claim 1, wherein the second object comprises a memory coupled to the second data processor, the memory comprising a voice index table.

13. A system comprising:
    a first object comprising:
       a radio frequency identification (RFID) tag reader;
       a first output device; and
       a first data processor electrically coupled to the first output device and the RFID tag reader;
       wherein the first object is configured to transmit an RF power signal comprising embedded input data, the input data embedded into the RF power signal by modulating the RF power signal between high and low levels at different time intervals; and
    a second object comprising:
       an RFID tag;
       a battery;
       a second output device; and
       a second data processor electrically coupled to the battery, the second output device and the RFID tag,
       wherein the second object is configured to receive, via the RFID tag, the RF power signal and perform an action specified by the embedded input data, wherein the embedded input data comprises a coded command to perform the action in response to a first audio or visual output from the first output device in the first object, the action being a second audio or visual output from the second output device that is responsive to the first audio or visual output, and responsive to receiving the RF power signal, transmit, by the RFID tag, response data to the RFID tag reader, wherein the first data processor processes the response data, and wherein the second data processor is configured to decode the coded command from the modulated RF power signal and responsive to the coded command execute instructions to cause the second object to perform the action.

14. The system of claim 13, wherein the first data processor is further configured to cause the RFID tag reader to modulate the RF power signal to embed the embedded input data.

15. The system of claim 14, wherein the RFID tag is configured to pass the modulated RF power signal to an input of the second data processor via an electrical coupling between a power supply terminal of the RFID tag and an input terminal of the second data processor.

16. The system of claim 13, wherein responsive to receiving the RF power signal, the second data processor updates status information comprising the response data stored in the RFID tag prior to the response data being transmitted by the RFID tag.

17. The system of claim 16, wherein the status information comprises one or more of a status of command execution, a status of a power level of the second object, or a status of a sensor of the second object.

18. The system of claim 13, wherein the first output device is a speaker, a visual indicator, or both, and
    the second output device is a speaker, a visual indicator, or both.

19. The system of claim 13, wherein the second object is a figurine.

20. The system of claim 19, wherein the figurine is one of a plurality of figurines in a set of figurines.

21. The system of claim 13, wherein the first object is an RFID platform comprising a game board configured for use with one or more second objects.

22. The system of claim 13, wherein the RFID tag is a passive RFID tag.

* * * * *